United States Patent [19]

Granzow et al.

[11] Patent Number: 4,645,153
[45] Date of Patent: Feb. 24, 1987

[54] TILT AND SWIVEL SUPPORT

[75] Inventors: Robert H. Granzow, Miamisburg; Harold S. Richard, Dayton; Thomas L. Hermann, Springfield, all of Ohio

[73] Assignee: NCR Corporation, Dayton, Ohio

[21] Appl. No.: 737,019

[22] Filed: May 23, 1985

[51] Int. Cl.$^4$ ............................................. F16M 11/04
[52] U.S. Cl. ...................................... 248/178; 248/181; 248/371
[58] Field of Search ............... 248/178, 179, 181, 182, 248/183, 184, 185, 186, 187, 349, 371, 425, 415, 418, 133, 139

[56] References Cited

U.S. PATENT DOCUMENTS

| D. 244,205 | 5/1977 | Benham et al. | D14/54 |
|---|---|---|---|
| D. 253,594 | 12/1979 | Antenbring | D14/40 |
| 2,922,609 | 1/1960 | Collier | 248/179 |
| 3,970,274 | 7/1976 | Resk | 248/185 |
| 3,970,792 | 7/1976 | Benham et al. | 179/2 |
| 4,068,961 | 1/1978 | Ebner et al. | 403/55 |
| 4,304,385 | 12/1981 | Farouche et al. | 248/410 |
| 4,354,654 | 10/1982 | Werner et al. | 248/663 |
| 4,365,779 | 12/1982 | Bates et al. | 248/371 |
| 4,372,515 | 2/1983 | Noonan | 248/178 |
| 4,395,010 | 7/1983 | Helgeland et al. | 248/371 |
| 4,410,159 | 10/1983 | McVicker et al. | 248/349 |
| 4,415,136 | 11/1983 | Knoll | 248/181 |
| 4,453,687 | 6/1984 | Sweere | 248/183 |
| 4,473,206 | 9/1984 | Stillinger | 248/371 |
| 4,483,503 | 11/1984 | Gahan | 248/181 X |
| 4,494,720 | 1/1985 | Gregory et al. | 248/371 |
| 4,533,105 | 8/1985 | Cornwell et al. | 248/371 |
| 4,542,872 | 9/1985 | Marino et al. | 248/183 |
| 4,547,027 | 10/1985 | Scheibenreif | 248/349 X |
| 4,549,710 | 10/1985 | Prince et al. | 248/349 X |
| 4,554,590 | 11/1985 | Chelin et al. | 248/181 X |
| 4,562,988 | 1/1986 | Bumgardner | 248/183 X |
| 4,564,166 | 1/1986 | Craft et al. | 248/349 |
| 4,570,892 | 2/1986 | Czech et al. | 248/183 |

FOREIGN PATENT DOCUMENTS

| 0041804 | 12/1981 | European Pat. Off. | 248/371 |
|---|---|---|---|
| 0070336 | 1/1983 | European Pat. Off. | |
| 0070335 | 1/1983 | European Pat. Off. | |
| 0128511 | 12/1984 | European Pat. Off. | 248/371 |
| 2503916 | 10/1982 | France. | |

Primary Examiner—Ramon O. Ramirez
Attorney, Agent, or Firm—Wilbert Hawk, Jr.; Albert L. Sessler, Jr.

[57] ABSTRACT

A tilt and swivel apparatus supports a structure such as a CRT display device above a stable base. Separate tilt and swivel mechanisms are provided to improve the stability of the apparatus. Stop elements limit the extent of tilting and rotation which is permitted. An internal passage is provided for cable connections to the supported structure.

14 Claims, 6 Drawing Figures

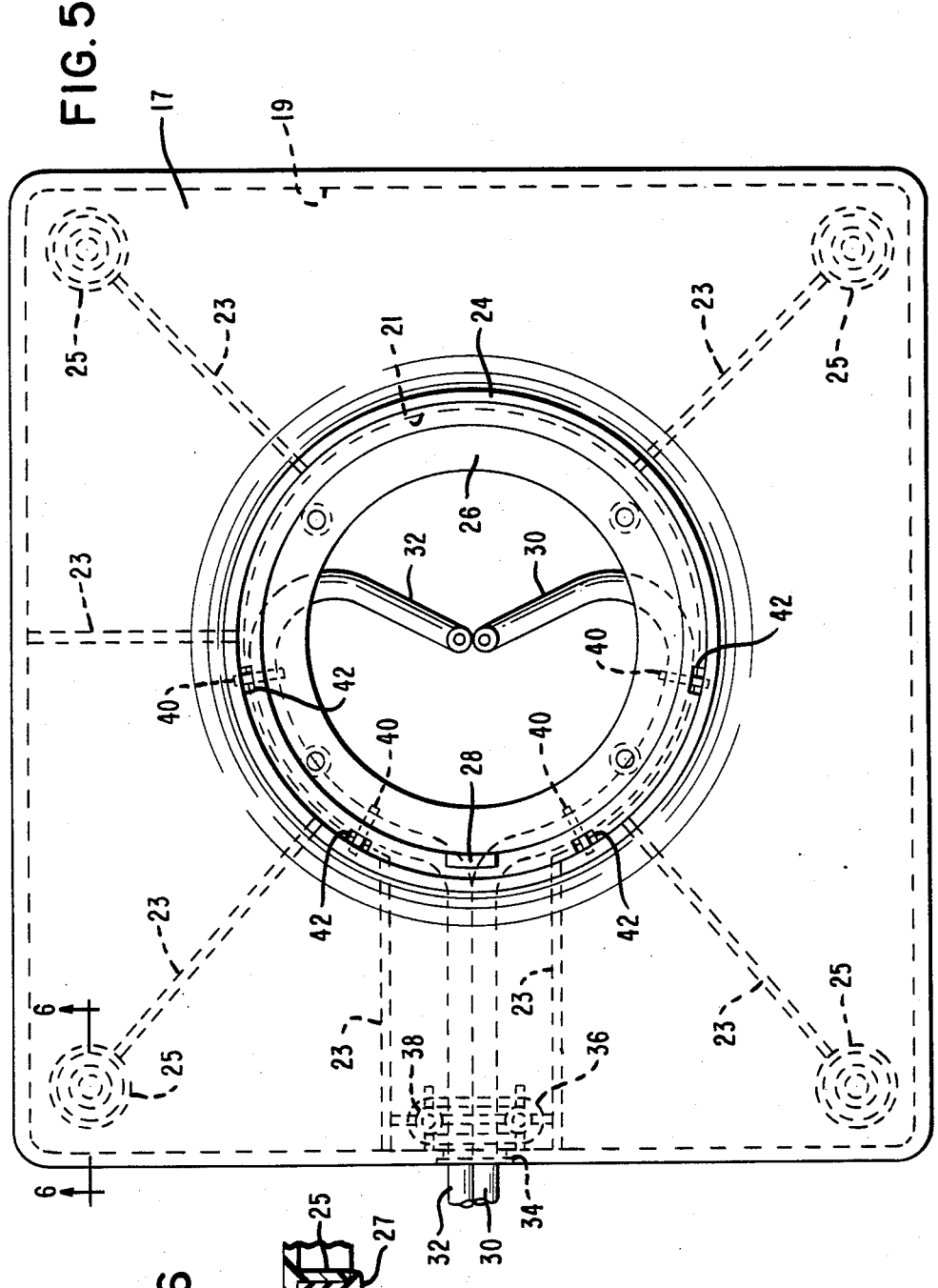
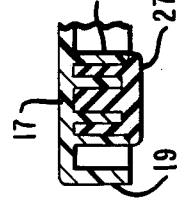

TILT AND SWIVEL SUPPORT

BACKGROUND OF THE INVENTION

The present invention relates generally to movable structure support mechanisms, and more particularly relates to apparatus for supporting a structure for tilting and swiveling or rotating motion.

Supporting devices having tilting and rotating capabilities are commonly employed to support structures such as a CRT display device in any one of a number of positions, to permit such a display device to be shifted from one position to another to enable it to be used by more than one person of differing height, and to enable a particular display of information to be developed on a terminal display by one person and to be shifted without undesired tilting movement to be shown to another person. The latter use finds particular application, for example, when a salesman, stock broker or bank loan officer calls up data on a display screen representing a product or situation and wishes to show it to a customer seated near him, by imparting a rotational movement to the supported CRT display. One problem which has been experienced with certain supporting devices is that when rotational movement is imparted to them, the frictional force between the various elements is lessened sufficiently that an undesired tilting movement also takes place. In extreme cases, the tilting motion may be of such magnitude as to cause the CRT display to shift downwardly so that the display is no longer readily viewable. Similarly, when it is desired to tilt, but not rotate, the CRT display, an inadvertent rotational movement may result.

SUMMARY OF THE INVENTION

The present invention provides an apparatus in which a structure is supported for both tilting and rotational movement, in which one type of movement may be achieved without also causing the other type of movement, if desired, and in which a combination of tilting and rotational movement may also be achieved, if desired.

In accordance with one embodiment of the invention, apparatus for supporting a structure for tilting and rotating motion comprises first means attachable to said structure and having a convex lower portion and a projection extending downwardly therefrom; socket means with respect to which said first means may move in tilting motion, having a concave portion complementary to the convex portion of said first means and being slotted to receive said projection and also having a peripheral bearing surface; second means attached to said projection for maintaining a predetermined frictional relationship between said first and second means and said socket means; base means having a base surface and also having a bearing surface for cooperating with the peripheral bearing surface of the socket means for rotational movement; and retaining means attached to said socket means for retaining said socket means in said base means.

It is accordingly an object of the present invention to provide a supporting structure for tilting and rotating motion.

A further object is to provide a tilt and swivel support structure in which one type of movement can be achieved without also causing the other type of movement.

A further object is to provide a tilt and swivel support structure in which separate cooperating surfaces are provided for enabling the two types of movement to take place.

With these and other objects, which will become apparent from the following description, in view, the invention includes certain novel features of construction and combinations of parts, a preferred form or embodiment of which is described with reference to the drawings which accompany and form a part of this specification.

BRIEF DESCRIPTON OF THE DRAWINGS

FIG. 5 is a sectional view taken along line 5—5 of FIG. 3.

FIG. 6 is a fragmentary sectional view taken along line 6—6 of FIG. 5.

DETAILED DESCRIPTION OF THE PREFERRED EMBODIMENT

Figure 1:
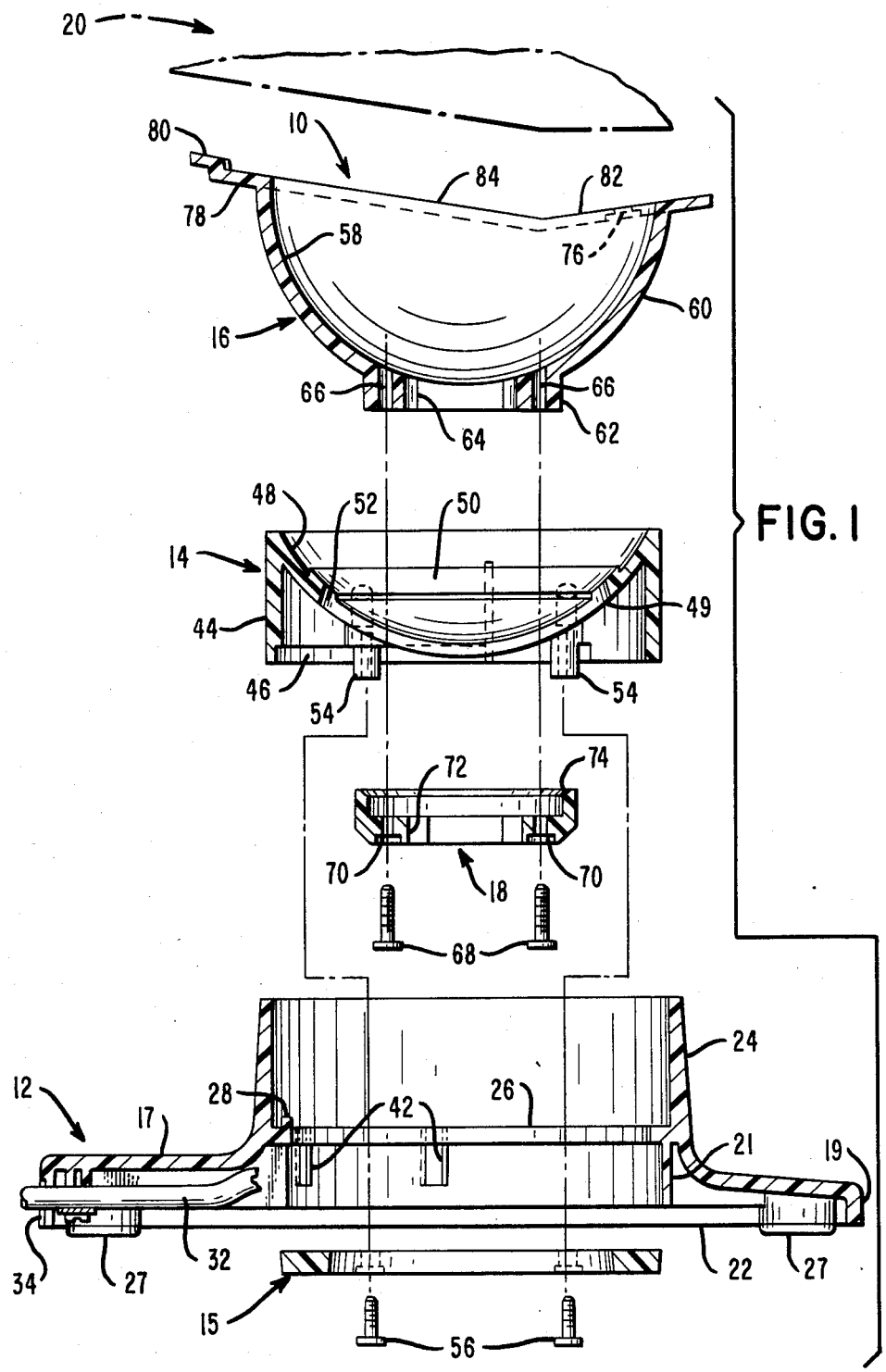
FIG. 1 is an exploded sectional view of the tilt and swivel support structure of the present invention.

Referring now to FIG. 1, the structure 10 shown there includes a base 12, a socket 14 which is rotatable within the base 12, a retainer 15 which retains the socket 14 in assembled relationship to the base 12, a tilting ball 16 having a convex surface which is disposed within a complementary surface of the socket 14, and tensioner 18 which maintains the ball 16 in assembled relationship to the socket 14 and which can provide a desired amount of frictional force between the ball 16 and the socket 14. The tilting ball may be secured to a display or other terminal 20, shown in phantom outline.

Figure 2:
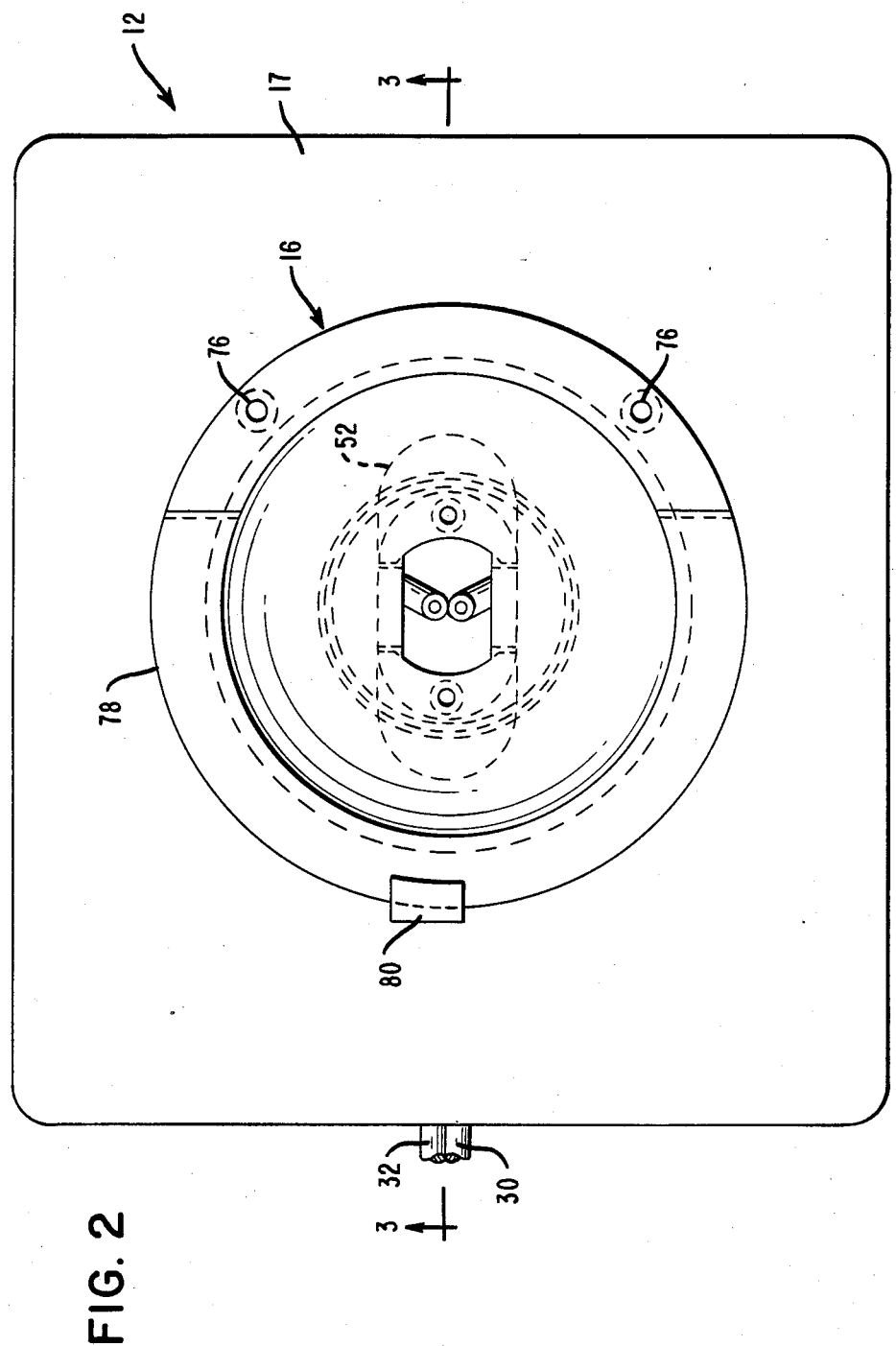
FIG. 2 is a plan view of the structure shown in FIG. 1.

The base 12 has an upper flat portion 17, a peripheral wall 19 and an extended flat lower surface 22, and is shown in FIG. 2 as being of generally rectangular shape for stability, though other shapes could be employed if desired. The base 12 includes an upstanding annular wall 24, an annular flange 26 disposed internally of said wall at the lower portion thereof, and another annular wall 21 extending downwardly from the flange 26. Internal reinforcing ribs 23 (FIG. 3) strengthen the base 12. Corner fittings 25 at the ends of certain of the ribs 23 are adapted to receive feet 27 of rubber or other suitable material to hold the base 12 against shifting when placed on a table or desk. The inner surface of the wall 24 and the upper surface of the flange 26 form bearing surfaces for engagement with complementary surfaces of the socket 14, as will be subsequently described in greater detail. An upstanding projection 28 on the flange 26 cooperates with a slot 46 in the complementary surface of the socket 14 to limit relative movement between the socket 14 and the base 12, as will also be described in greater detail.

Figure 3:
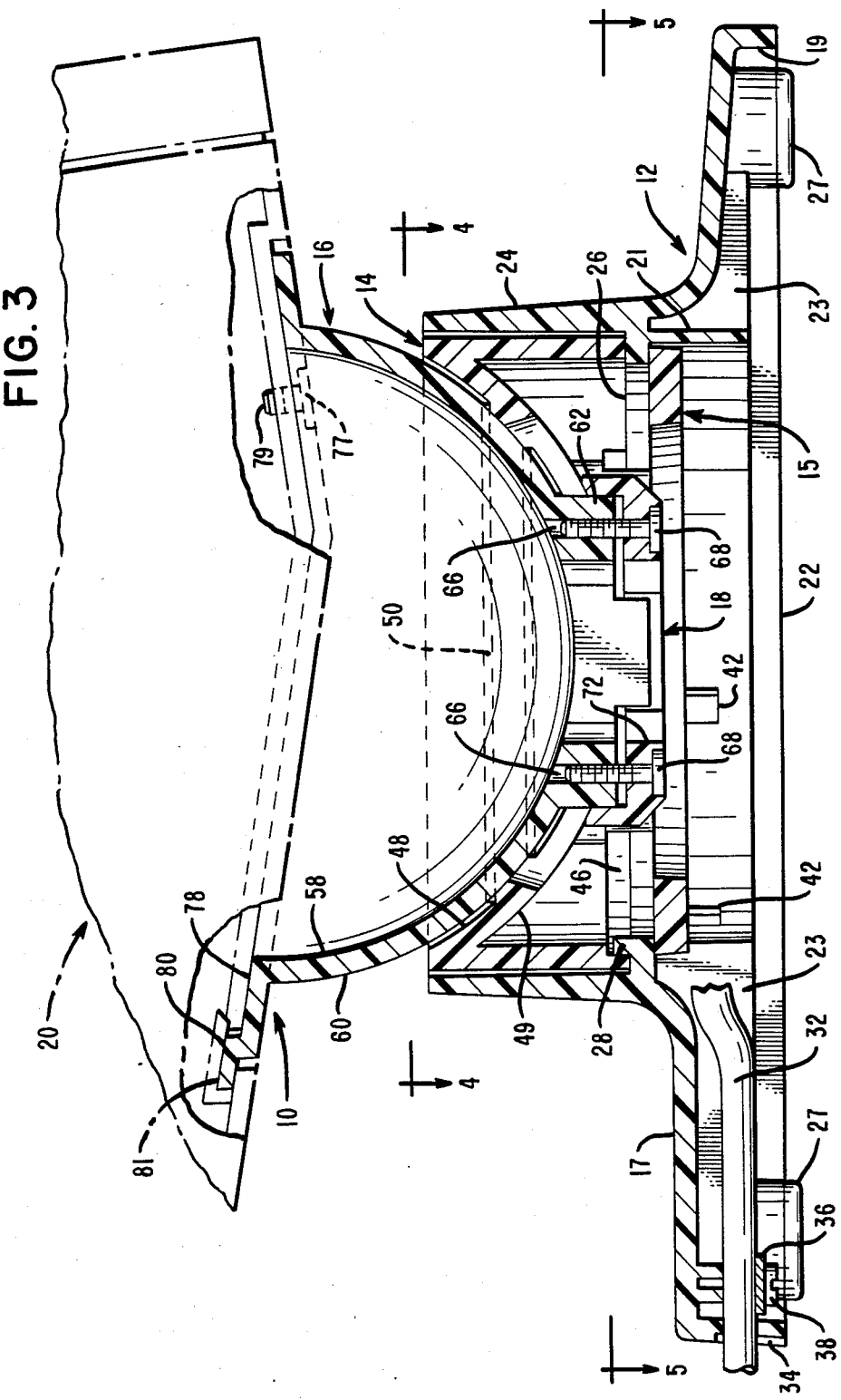
FIG. 3 is a sectional view taken along line 3—3 of FIG. 2.
Figure 4:
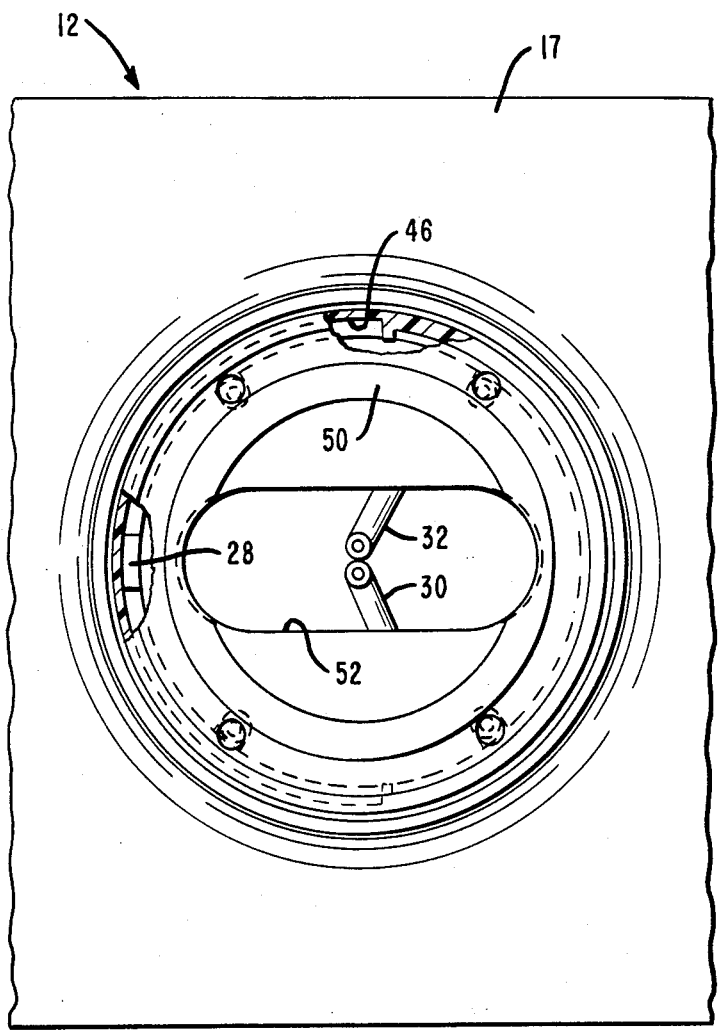
FIG. 4 is a sectional view taken along line 4—4 of FIG. 3.

The support structure 10 of the present invention is used most frequently in supporting an electronic terminal or display device 20 which requires at least one cable associated therewith in order to function. If such a cable extends in plain view from the terminal or display, it is unsightly and may interfere with efficient use of the terminal by becoming entangled with the support or with other items placed on the table or desk adjacent to the support structure. For these reasons, it is desirable that the cable should enter the base and extend upwardly internally through the support structure to its connection to the terminal. Accordingly, it will be seen that cables 30 and 32 enter the base 12 via an aperture 34 on the left side, as viewed in FIGS. 1 and 3, are bent around the central opening defined by the wall 21, and then extend upwardly to the terminal 20. A clamp 36 (FIGS. 3 and 5) cooperates with the aperture 34 to retain the cables 30, 32 in position at their point of entry to the base 12. Screws 38 or other suitable fastening means may be employed to hold the clamp 36 in place. Cable ties 40 extend through openings 42 in the wall 21 and flange 26 and around the cables 30, 32 to retain them in circumferential position around the central opening of the base 12. If desired, the cables 30, 32 could also be retained in a circumferential position by other means such as clamps or other additional part of parts in the base 12, which would eliminate the need for cable ties.

The socket 14 includes a cylindrical outer wall 44 which has a height and an outside diameter of suitable dimensions to fit within the opening defined by the wall 24 of the base 12, and to rest upon the flange 26 of said base for rotational movement of the socket 14 with respect to said base. The projection 28 on the flange 26 engages a discontinuous slot 46 in the bottom of the wall 44 to limit the relative movement of the socket 14 and base 12 to approximately 180 degrees, which prevents damage to the cables 30 and 32 from excessive winding.

The upper surface 48 of the socket 14 is ofgeneraly concave configuration to accommodate the hemispherical lower portion of the ball 16, as will be subsequently described. A lower surface 49 of the socket 14 is generally convex in configuration to provide a generally uniform wall thickness between the surfaces 48 and 49. A raised annular portion 50 on said upper surface provides a bearing surface on which said hemispherical portion of the ball 16 may move in tilting motion. An elongated slot 52 is centrally disposed in said upper surface 48, and terminates in curved portions at either end. Four bosses 54 extend downwardly from the other side of the upper surface 48, and are internally threaded to receive screws 56 which serve to attach the retainer 15 to the bosses 54, so that the flange 26 is positioned between the bottom surface of the wall 44 and the retainer 15, thus retaining the socket 14 against removal from the base 12. In order to provide the desired low coefficient of friction on the bearing surface 50 and on the external and bottom surfaces of the cylindrical outer wall 44, the entire socket 14 may be fabricated from a suitable low-friction material, such as "Valox" plastic, manufactured by General Electric Company. The use of two different materials at bearing points reduces or eliminates sticking and galling of the cooperating elements.

As noted above, the ball 16 has a lower generally hemispherical surface 60 which fits within the upper surface 48 of the socket 14, and bears on the annular surface 50. An upper surface 58 of the ball 16 is concave in configuration to provide a generally uniform wall thickness between the surfaces 58 and 60. A projection 62 having an aperture 64 therethrough extends downwardly from the surface 60 and fits within the slot 52 in the socket 14 to limit and define the tilting movement of the ball 16 with respect to the socket 14. Threaded bores 66 in the projection 62 are adapted to receive adjusting screws 68 which also pass through apertures 70 in the tensioner 18. The tensioner 18 is provided with a central stepped aperture 72 and an upper angled annular surface 74 which is configured to engage the lower surface 49 of the socket 14. By adjustment of the screws 64, the force with which the surfaces 60 and 74 engage the surfaces 50 and 49 can be varied, to adjust the force by which a particular angle of tilt is maintained.

The ball 16 may be secured by any suitable means to the display or terminal 20 which it supports. In the illustrated embodiment, a plurality of screws 77 extending through apertures 76 in a flange 78 of the ball 16, in combination with a tongue 80 integral with said flange, are employed. The screws 77 may enter threaded apertures 79 in the terminal for engagement therewith after the tongue 80 has been inserted in a complementary slot 81 in the terminal 20. Also, in the illustrated embodiment, the flange 78 is comprised of two angled surfaces 82 and 84, to mate with the corresponding lower surfaces of the terminal 20. However it will be understood that the upper portion of the ball 16 could be configured as a single plane, or in any other suitable configuration, to match the mating surface or surfaces of the terminal 20.

As previously mentioned, the cables 30 and 32 enter the base 12 through the aperture 34 and are passed upwardly through the interior of the support 10. Apertures 72, 52 and 64 in the tensioner 18, socket 14 and ball 16, respectively, are provided for this purpose.

In operation, it will be seen that the rotating and tilting movements of the structure 10 are separate and distinct. Thus rotation is accomplished by relative movement of the socket 14 with respect to the base 12 and tilting is accomplished by relative movement of the ball 16 with respect to the socket 14. Either one of a tilting or a rotational movement can be carried out without in any way affecting the other, so that, for example, rotation of the terminal 20 from one viewing position to another does not produce an undesired accompanying tilting movement, which might result in a "drooping" of the terminal 20 out of optimum viewing position.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. Apparatus for supporting a structure for tilting and rotating motion, comprising:

first means attachable to said structure and having a convex lower portion and a projection extending downwardly therefrom;

socket means with respect to which said first means may move in tilting motion, having a concave portion complementary to the concave portion of said first means and being slotted to receive said projection, and also having a peripheral bearing surface;

second means attached to said projection for maintaining a predetermined frictional relationship between said first and second means and said socket means, and including a clamping means and a plurality of screws extending through the clamping means and threadedly engaging the socket means;

base means having a base surface and also having a bearing surface for cooperating with the peripheral bearing surface of the socket means for rotational movement; and retaining means attached to said socket means for retaining said socket means in said base means.

2. Apparatus for supporting a structure for tilting and rotating motion, comprising:

first means attachable to said structure and having a convex lower portion and a projection extending downwardy therefrom;

socket means with respect to which said first means may move in tilting motion, having a concave portion complementary to the conex portion of said first means and being slotted to receive said projection, said concave portion including a bearing area which comprising a raised annular portion of said concave portion, and also having a peripheral bearing surface;

second means attached to said projection for maintaining a predetermined frictional relationship between said first and second means and said socket means;

base means having a base surface and also having a bearing surface for cooperating with the peripheral bearing surface of the socket means for rotational movement; and retaining means attached to said socket means for retaining said socket means in said base means.

3. The apparatus of claim 2 in which said socket means is made of a low-friction plastic material.

4. The apparatus of claim 2 in which one of the cooperating bearing surfaces of the socket means and the base means is a low-friction plastic material.

5. The apparatus of claim 2 in which said first means, said socket means, said second means and said base means all have aligned centrally located openings to provide a path whereby cable means may be run from the base means to said structure.

6. Apparatus for supporting a structure for tilting and rotating motion, comprising:

first means attachable to said structure and having a generally hemispherical lower portion and a projection extending downwardly therefrom;

socket means with respect to which said first means may move in tilting motion, having a concave portion with a bearing area thereon for receiving the hemispherical portion of said first means, having a slot therein through which said projection extends, with movement being constrained by the interaction of said projection and said slot, and having a circumferential flanged bearing portion thereon;

clamping means attached to said projection at its end, and having an upper peripheral surface located so that a portion of said socket means is positioned between said surface and the hemispherical portion of said first means;

tensioning means for altering the force exerted on the socket means by the first means and the clamping means;

base means having an upstanding annular portion within which the circumferential flanged bearing portion of the socket means is received for rotational movement, and an annular support means contiguous to the upstanding annual portion for supporting the socket means within the upstanding annular portion; and retaining means spaced from and secured to the socket means to receive the annular support means therebetween.

7. The apparatus of claim 6, also including means for limiting the rotational movement of the socket means with respect to the base means.

8. The apparatus of claim 6 in which the tensioning means comprises a plurality of screws extending through the clamping means and threadedly engaging the socket means.

9. The apparatus of claim 6 in which said bearing area of said socket means comprises a raised annular portion of said concave portion.

10. The apparatus of claim 6 in which said bearing area is a low-friction plastic material.

11. The apparatus of claim 6 in which said socket means is made of a low-friction plastic material.

12. The apparatus of claim 6 in which one of the cooperating rotational bearing surfaces is a low-friction plastic material.

13. The apparatus of claim 6 in which the surface of the socket means which engages the upper peripheral surface of the clamping means is generally hemispherical in configuration.

14. The apparatus of claim 6 in which said first means, said socket means, said clamping means and said base means all have aligned openings to provide a path whereby cable means may be run from the base means to said structure.

* * * * *

UNITED STATES PATENT AND TRADEMARK OFFICE
CERTIFICATE OF CORRECTION

PATENT NO. : 4,645,153

DATED : February 24, 1987

INVENTOR(S) : Robert H. Granzow et al.

It is certified that error appears in the above—identified patent and that said Letters Patent is hereby corrected as shown below:

Column 4, line 58 delete "concave" and substitute --convex--.

Column 5, line 12 delete "conex" and substitute --convex--.

Column 5, line 15 delete "comprising" and substitute --comprises--.

Signed and Sealed this

Twenty-eighth Day of April, 1987

*Attest:*

DONALD J. QUIGG

*Attesting Officer*  *Commissioner of Patents and Trademarks*